(12) United States Patent
Yokotani et al.

(10) Patent No.: US 7,468,604 B2
(45) Date of Patent: Dec. 23, 2008

(54) MAGNETIC DETECTOR MAINTAINING HIGH DETECTION PRECISION WITHOUT AFFECTED BY THE TEMPERATURE CHARACTERISTICS OF THE SENSING ELEMENT

(75) Inventors: Masahiro Yokotani, Tokyo (JP); Naoki Hiraoka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 60 days.

(21) Appl. No.: 11/645,520

(22) Filed: Dec. 27, 2006

(65) Prior Publication Data

US 2007/0285086 A1 Dec. 13, 2007

(30) Foreign Application Priority Data

Jun. 8, 2006 (JP) ............................. 2006-159666

(51) Int. Cl.
*G01B 7/30* (2006.01)
(52) U.S. Cl. ........................... 324/207.25; 324/207.21; 324/225; 324/174; 324/207.12
(58) Field of Classification Search . 324/207.2–207.25, 324/225, 174, 207.12
See application file for complete search history.

(56) References Cited

U.S. PATENT DOCUMENTS

| | | | | |
|---|---|---|---|---|
| 5,821,745 A | * | 10/1998 | Makino et al. | 324/207.25 |
| 6,630,821 B2 | * | 10/2003 | Shinjo et al. | 324/207.21 |
| 6,870,365 B1 | * | 3/2005 | Yokotani et al. | 324/207.25 |
| 7,045,997 B2 | * | 5/2006 | Yokotani et al. | 324/207.21 |

FOREIGN PATENT DOCUMENTS

JP 2005-156368 A 6/2005

* cited by examiner

*Primary Examiner*—Jay M Patidar
(74) *Attorney, Agent, or Firm*—Sughrue Mion, PLLC (57) ABSTRACT

A magnetic detector, wherein the magnetic/electric conversion element is constituted by at least six segments symmetrically arranged in a direction in which the magnetic moving body rotates maintaining a predetermined pitch with respect to the center line of the magnet, first and second bridge circuits are constituted so as to produce outputs accompanying the rotation of the magnetic moving body, and a third bridge circuit is constituted so as to produce an output accompanying the rotation of the magnetic moving body, and wherein a comparison level of a comparator circuit that shapes the waveform of a differential output signal of the first and second bridge circuits is adjusted relying upon an output signal of the third bridge circuit.

5 Claims, 8 Drawing Sheets

PRIOR ART

FIG. 5C

PRIOR ART

FIG. 5D

PRIOR ART

MAGNETIC DETECTOR MAINTAINING HIGH DETECTION PRECISION WITHOUT AFFECTED BY THE TEMPERATURE CHARACTERISTICS OF THE SENSING ELEMENT

BACKGROUND OF THE INVENTION

1. Field of the Invention

This invention relates to a magnetic detector using reluctance segments and, more particularly, to a magnetic detector capable of detecting a change in the magnetic field caused by the motion of a magnetic moving body coupled to an object that is to be detected.

2. Description of the Related Art

In recent years, a car-mounted rotation sensor and the like are utilizing a magnetic detector which detects a change in the magnetic field acting on the reluctance elements by constituting a bridge circuit by forming electrodes at the ends of the reluctance segments, connecting a constant-voltage and constant-current source between the two opposing electrodes of the bridge circuit, and converting a change in the resistance of the reluctance segments into a change in the voltage, and various proposals have been made so far.

A conventional magnetic detector has been disclosed in, for example, JP-A-2005-156368 according to which a detector unit in the processing circuit is constituted by at least six magnetic/electric conversion elements. According to this magnetic detector as will be understood from the description of the specification thereof, the magnetic/electric conversion element is constituted by at least six segments that are symmetrically arranged along the direction in which the magnetic moving body rotates maintaining a predetermined pitch with respect to a center line of the magnet that intersects the direction of rotation at right angles, first and second bridge circuits are formed including at least two pairs of segments which are so arranged that the centers of pitch are symmetrical to each other with respect to the center line of the magnet so as to produce outputs accompanying the rotation of the magnetic moving body, and a third bridge circuit is formed including at least a pair of segments having a center of pitch on the center line of the magnet so as to produce an output accompanying the rotation of the magnetic moving body, wherein a phase difference of ¼ period is imparted to between the output of the third bridge circuit and the differential output of the first and second bridge circuits, so that the direction in which the magnetic moving body is rotating can be correctly detected even when the comparison level of the comparator circuit has fluctuated or even when the output of the amplifier circuit has fluctuated.

Figure 5A:
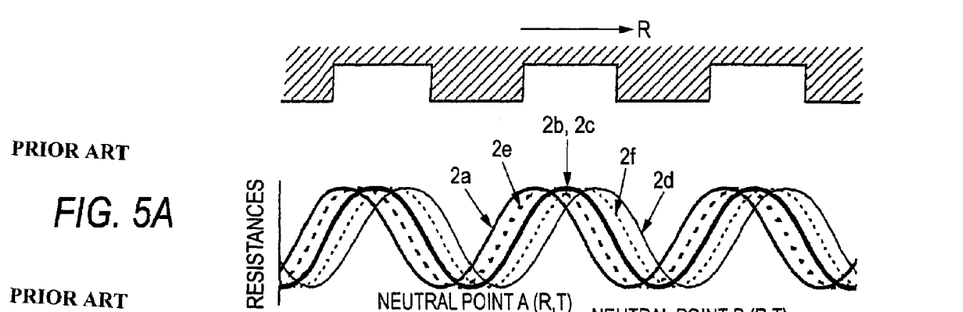
FIGS. 5A-5E; is a diagram of signal waveforms at various portions at the occurrence of a temperature offset while rotating forward in a conventional magnetic detector.

In the above conventional magnetic detector, however, it has been known that a temperature offset occurs in the neutral point output due to a change in the environmental temperature being caused by a difference in the temperature characteristics of the reluctance segments constituting the bridge circuits. FIG. 5 is a diagram of operation waveforms illustrating the states at that time, wherein FIG. 5A represents resistances of the reluctance segments, FIG. 5B represents the neutral point outputs A and B of the first and second bridge circuits, FIG. 5C represents outputs OP1 and OP2 of the amplifier circuits, FIG. 5D represents outputs Vout1 and Vout2 of the comparator circuits, and FIG. 5E represents final outputs 1 and 2 of the output circuits.

Figure 5B:
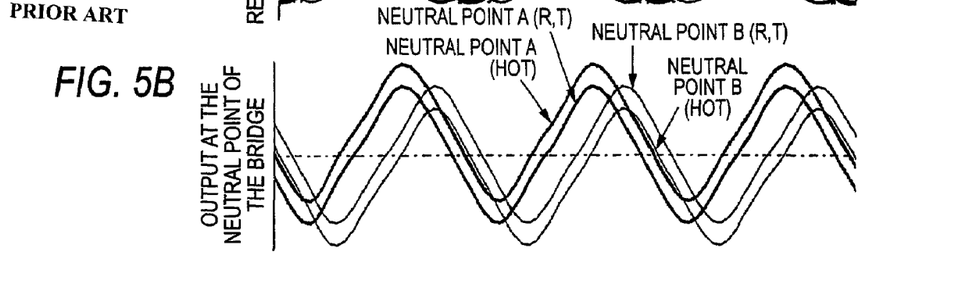
Figure 5C:
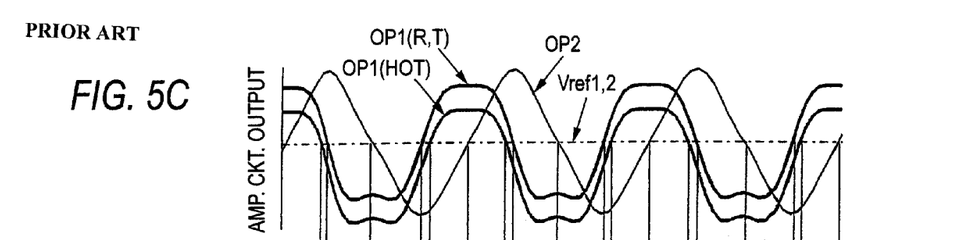
Figure 5D:
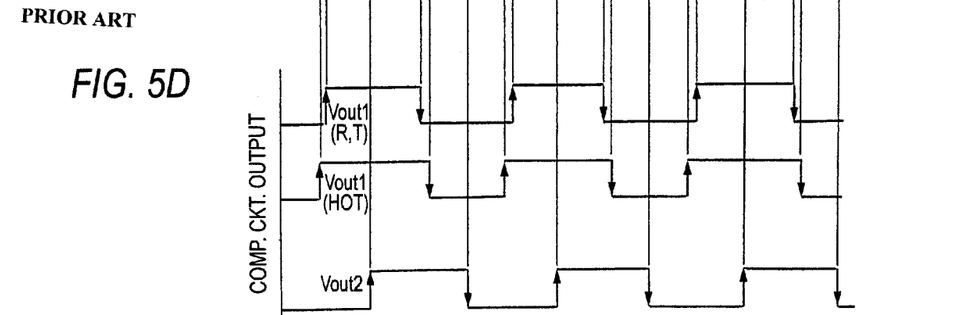
Figure 5E:
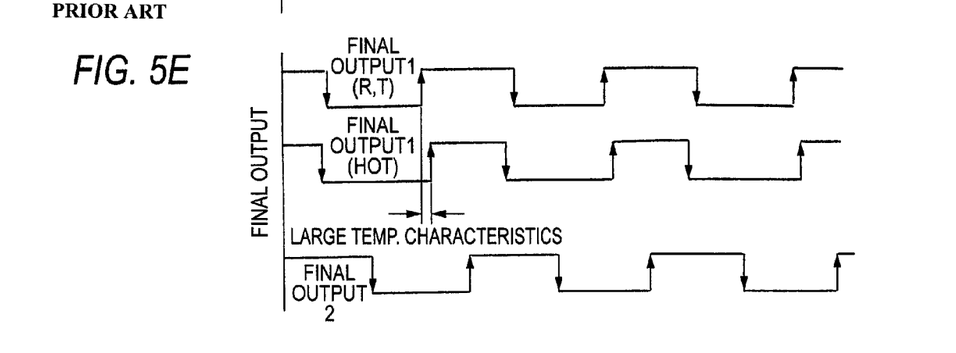

In an environment where, for example, the temperature characteristics varies greatly, as will be obvious from the drawing, the waveforms of the neutral point output A and of the neutral point output B differ between a high temperature state (HOT) and a room temperature state (R.T) as shown in FIG. 5B, and the effect appears on the comparator circuit output Vout1 (see FIG. 5D). A temperature offset T1 further appears on the final output 1, too. As a result, the precision of detection of the magnetic detector decreases and the direction of rotation cannot be detected correctly.

SUMMARY OF THE INVENTION

It is therefore an object of the present invention to provide a magnetic detector which is so constituted as to impart a phase difference of ¼ period to between the output of the third bridge circuit and the differential output of the first and second bridge circuits, and is capable of maintaining a correct detection precision even when a temperature offset has occurred.

The problem of offset is caused not only by a change in the temperature characteristics of the magnetic/electric conversion elements but also by dispersion in the fabrication of the magnetic/electric conversion elements. The invention, therefore, has an object of providing a magnetic detector capable of realizing stable operation even against such changes and fluctuations.

A magnetic detector of the present invention comprises a detection unit constituted by a magnetic/electric conversion element which has a plurality of segments for detecting the intensity of the applied magnetic field; a magnet arranged for applying a magnetic field to the magnetic/electric conversion element; and a magnetic moving body for varying the magnetic field; wherein, the magnetic/electric conversion element is constituted by at least six segments symmetrically arranged in a direction in which the magnetic moving body rotates maintaining a predetermined pitch with respect to the center line of the magnet that intersects the direction of rotation of the magnetic moving body at right angles;

first and second bridge circuits are constituted to include at least two pairs among the segments which are so arranged that the centers of pitch are symmetrical to each other with respect to the center line of the magnet so as to produce outputs accompanying the rotation of the magnetic moving body; and a third bridge circuit is constituted to include at least a pair among the segments having a center of pitch on the center line of the magnet so as to produce an output accompanying the rotation of the magnetic moving body; and wherein, a comparison level of a comparator circuit that shapes the waveform of a differential output signal of the first and second bridge circuits is adjusted relying upon an output signal of the third bridge circuit.

The present invention provides a magnetic detector which stably maintains a high detection precision without affected by the temperature characteristics of the magnetic/electric conversion element or by dispersion in the fabrication.

The foregoing and other object, features, aspects, and advantages of the present invention will become more apparent from the following detailed description of the present invention when taken in conjunction with the accompanying drawings.

DESCRIPTION OF THE PREFERRED EMBODIMENT

Embodiment 1

Figure 1A:
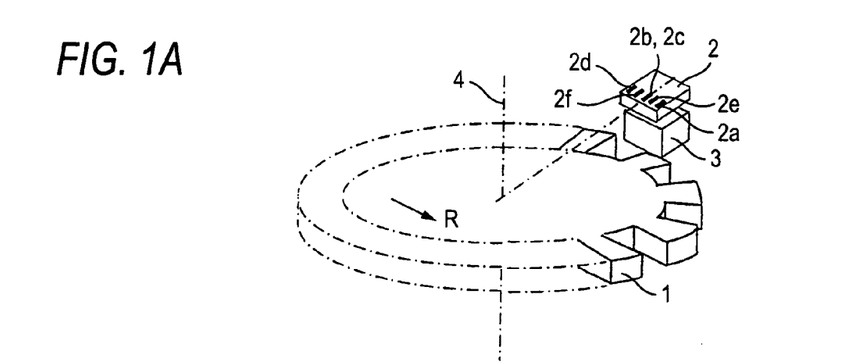
FIGS. 1A-1C; is a view illustrating the whole constitution of a magnetic detector according to an embodiment 1 of the invention.
Figure 1B:
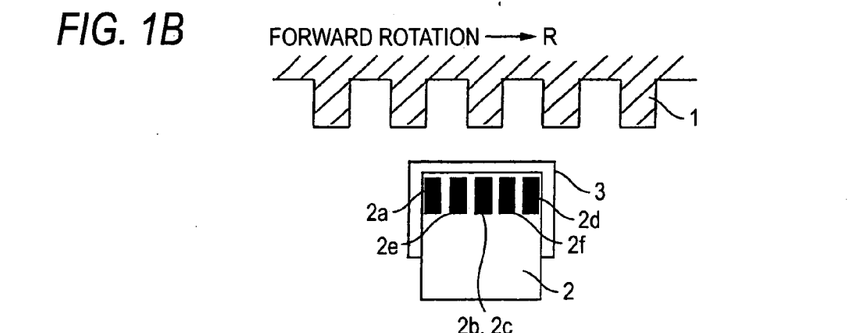
Figure 1C:
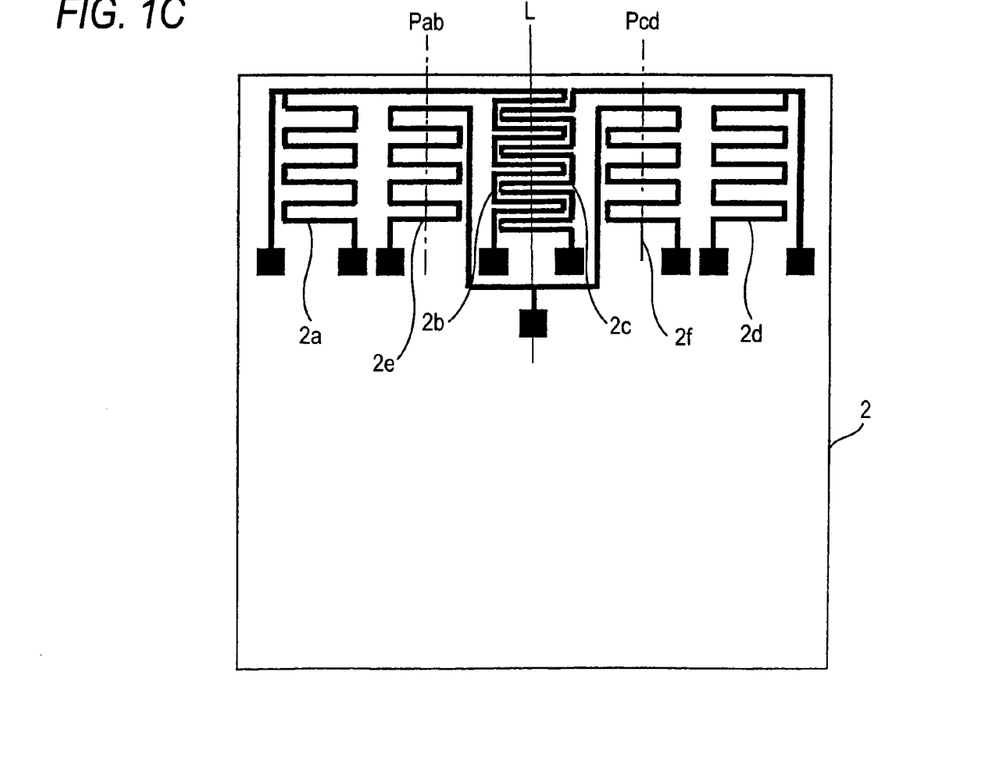
Figure 2:
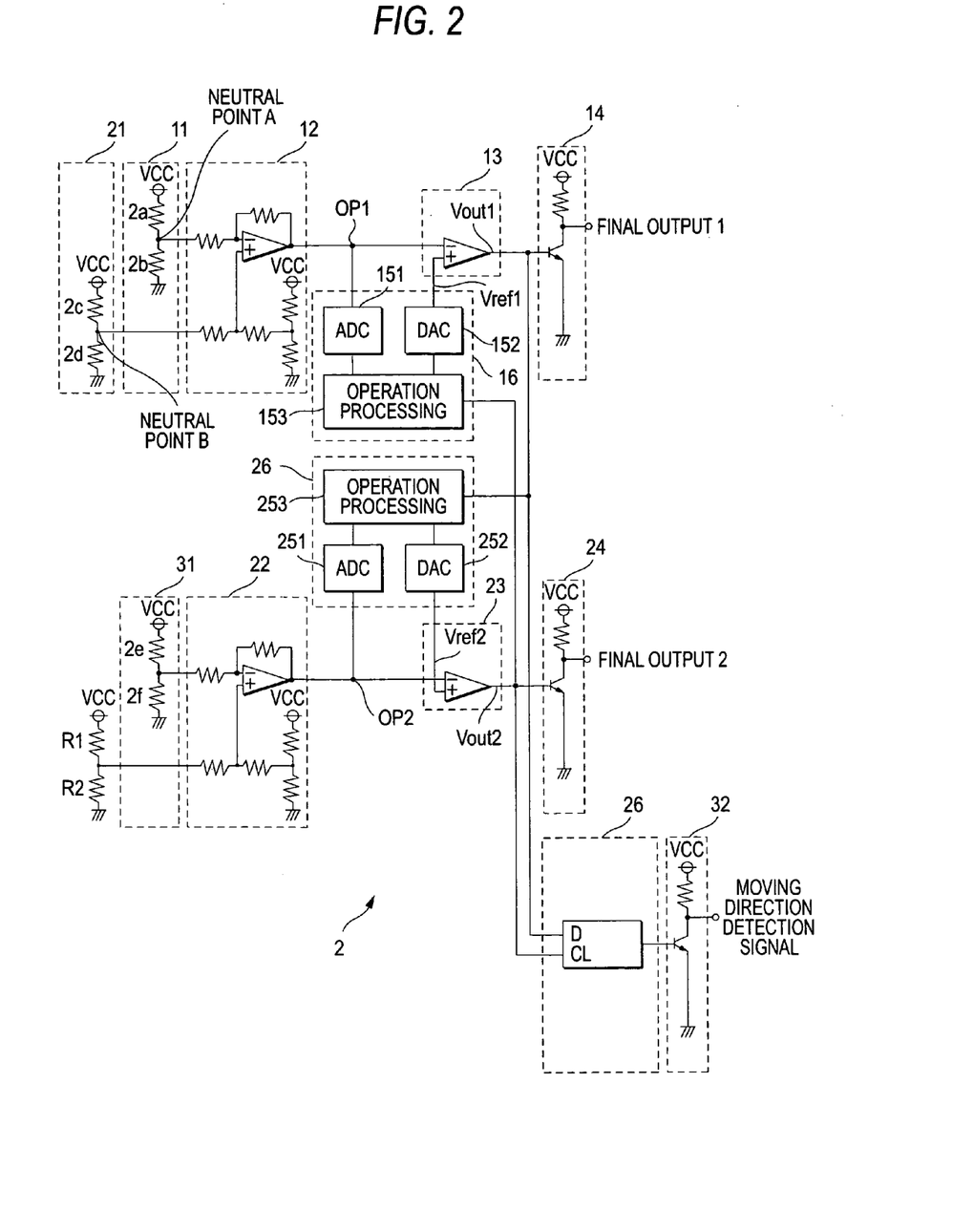
FIG. 2 is a diagram illustrating the constitution of a signal-processing circuit according to the embodiment 1 of the invention.

A first embodiment of the invention will now be described. FIG. 1 is a view illustrating the whole constitution of a magnetic detector according to the invention, wherein FIG. 1A is a perspective view illustrating the constitution of a magnetic circuit, FIG. 1B is a top view illustrating a portion thereof on an enlarged scale, and FIG. 1C is a view of a pattern of reluctance segments on an enlarged scale. FIG. 2 is a diagram illustrating the constitution of a signal-processing circuit in detail. In the drawings, reference numeral 1 denotes a magnetic moving body having a shape that varies the magnetic field, and 2 denotes a signal-processing circuit portion which is constituted by an IC chip.

Reference numeral 3 denotes a magnet which is arranged facing the magnetic moving body 1 and is magnetized in the direction of rotary shaft of the magnetic moving body, and 4 denotes a rotary shaft. As the rotary shaft 4 rotates, the magnetic moving body 1 rotates in synchronism therewith. Six reluctance segments 2a to 2f are formed by forming a film on the signal-processing circuit portion 2 which is comprised of the IC chip, and are arranged in a predetermined direction in which the magnetic moving body 1 rotates, for example, along the direction of forward rotation denoted by R, symmetrically with respect to the center line L of the magnet 3 that intersects the direction of rotation at right angles.

Among six of them, two reluctance segments 2b and 2c are formed intersecting each other like comb teeth on the center line L of the magnet 3. First and second bridge circuits 11 and 21 are formed by pairs of reluctance segments 2a, 2b and 2c, 2d which are so arranged that the centers Pab and Pcd of pitches are symmetrical to each other with respect to the center line L of the magnet 3, and a third bridge circuit 31 is formed by a remaining pair of reluctance segments 2e and 2f having the center of pitch on the center line L of the magnet 3.

Next, the signal-processing circuit 2 will be described in detail with reference to FIG. 2. The first bridge circuit 11 constituted by the reluctance segments 2a and 2b is impressed with a constant voltage Vcc, whereby changes in the resistances of the reluctance segments 2a and 2b caused by a change in the magnetic field are converted into changes in the voltage. The second bridge circuit 21 constituted by the reluctance segments 2c and 2d is, similarly, impressed with the constant voltage, whereby changes in the resistances of the reluctance segments 2c and 2d caused by a change in the magnetic field are converted into changes in the voltage. A neutral point output A and a neutral point output B after the voltage conversion are amplified through an amplifier circuit 12, and are input to a comparator circuit 13. One of the signals compared with a predetermined voltage Vref1 in the comparator circuit 13 is converted into a final output 1 through an output circuit 14. The output of the comparator circuit 13 is further input to a terminal D of a D flip-flop circuit 26.

Further, the third bridge circuit 31 constituted by the reluctance segments 2e and 2f, too, is similarly impressed with the constant voltage, whereby changes in the resistances of the reluctance segments caused by a change in the magnetic field are converted into changes in the voltage. Moreover, a fourth bridge circuit constituted by reluctance segments or fixed resistances R1 and R2, too, is similarly impressed with the constant voltage Vcc, whereby changes in the resistances of the reluctance segments caused by a change in the magnetic field are converted into changes in the voltage. The output signals are amplified through an amplifier circuit 22, and are input to a comparator circuit 23. One of the signals compared with a predetermined voltage Vref2 in the comparator circuit 23 is converted into a final output 2 through an output circuit 24. The output of the comparator circuit 23 is further input to a terminal CL of the D flip-flop circuit 26 and to a separate comparator circuit 15. The output signal of the D flip-flop circuit 26 is converted into a moving direction detection output through an output circuit 32.

The neutral point output A and the neutral point output B after the voltage conversion are differentially amplified through the amplifier circuit 12, and an output OP1 thereof is input to an inverted input terminal of the comparator circuit 13. The output OP1 at the same time is also input to a comparison level-adjusting circuit 15 and is operated as will be described later.

The comparison level-adjusting circuit 15 includes an A/D converter 151, a D/A converter 152, and an operation processing circuit 153. A differentially amplified output OP1 input thereto is input to the operation processing circuit 153 through the A/D converter 151. The operation processing circuit 153 executes a predetermined operation processing, and the result thereof is input as a comparison level Vref1 to the non-inverted output terminal of the comparator circuit 13 via the D/A converter 152. On the other hand, the differentially amplified output OP2 is input to a comparison level-adjusting circuit 25 which includes an A/D converter 251, a D/A converter 252 and an operation processing circuit 253, and is operated therein in a similar way, and is input as a comparison level Vref2 to the non-inverted output terminal of the comparator circuit 23.

As described above, one output Vout1 of the comparator circuit 13 is input to the output circuit 14 and is output as a final output 1. Another one is input to the terminal D of the D flip-flop circuit 26. The other one is input to the operation processing circuit 253 in the comparison level-adjusting circuit 25. Further, one output Vout2 of the comparator circuit 23 is input to the output circuit 24 and is output as a final output 2. Another one is input to the terminal CL of the D flip-flop circuit 26. The other one is input to the operation processing circuit 153 in the comparison level-adjusting circuit 15. The output of the D-flip-flop circuit 26 is input to the output circuit 32 and is output as a moving direction detection output.

Figure 3A:
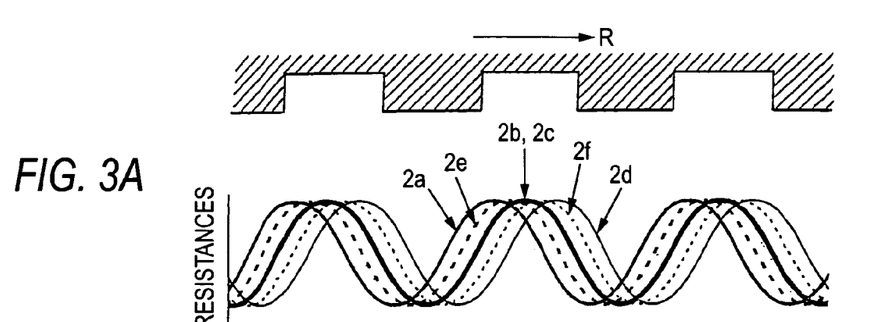
FIGS. 3A-3G; is a diagram of signal waveforms at various portions when rotating forward in a normal state according to the embodiment 1 of the invention.
Figure 3B:
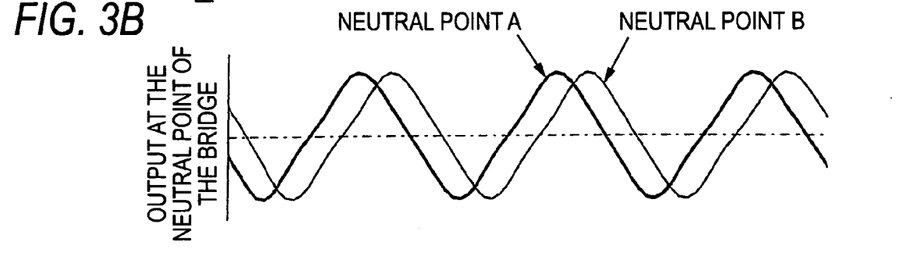
Figures 3C, 3D:
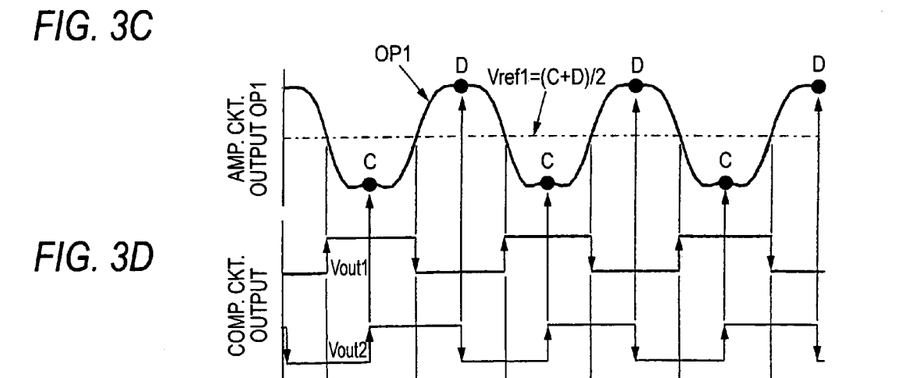
Figure 3E:
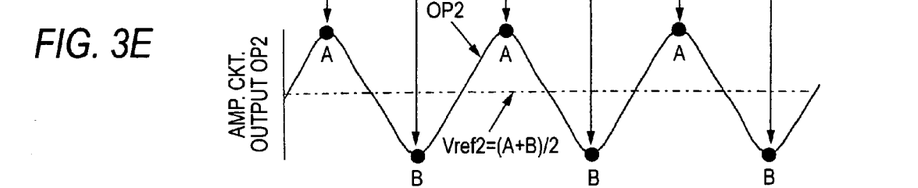
Figure 3F:
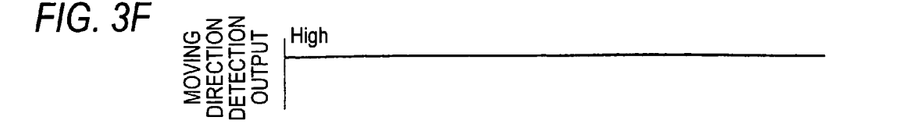
Figure 3G:
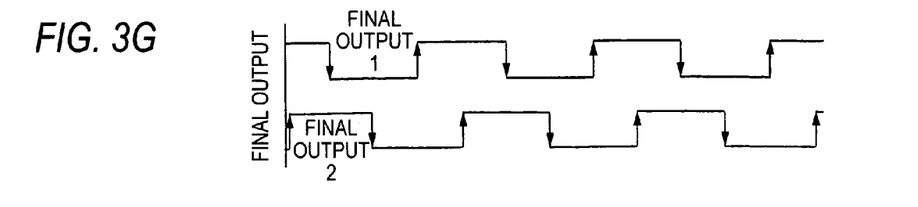

FIG. 3 is a diagram of operation waveforms of the circuit shown in FIG. 2, wherein FIG. 3A represents resistances of the reluctance segments, FIG. 3B represents the neutral point outputs A and B of the first and second bridge circuits 11 and 21, FIG. 3C represents the output OP1 of the amplifier circuit 12, FIG. 3D represents outputs Vout1 and Vout2 of the comparator circuits 13 and 23, FIG. 3E represents the output OP2 of the amplifier circuit 22, FIG. 3F represents the moving direction detection output, and FIG. 3G represents final outputs 1 and 2 of the output circuits 14 and 24.

The comparison level-adjusting circuit 15 reads the output OP1 of the amplifier circuit 12 at a timing of the output Vout2 of the comparator circuit 23 or, concretely, at moments when the output Vout2 of the comparator circuit 23 rises and breaks, and operates, through the operation processing circuit 153, an average value of outputs that are read. Similarly, the comparison level-adjusting circuit 25 reads the output OP2 of the amplifier circuit 22 at a timing of the output Vout1 of the comparator circuit 13 or, concretely, at moments when the output Vout1 of the comparator circuit 13 rises and breaks, and operates, through the operation processing circuit 253, an average value of outputs that are read.

That is, in FIG. 3C, the amplifier circuit output OP1 is read for its voltage at points C and D at the timing of Vout2 (see FIG. 3D), and the comparison level-adjusting circuit 15 operates (C+D)/2, which is then output as a comparison level Vref1 of the comparator circuit 13. On the other hand, the amplifier circuit output OP2 in FIG. 3E is read for its voltage at points A and B at the timing of Vout1, and the comparison level-adjusting circuit 25 operates (A+B)/2, which is then output as a comparison level Vref2 of the comparator circuit 23.

FIG. 4 illustrates the operation of when temperature offsets occurs in the neutral point outputs A and B due to difference in the temperature characteristics of the magnetic/electric conversion elements 2a, 2b and 2c, 2d. FIG. 4 uses symbols corresponding to those of FIG. 3. That is, even when temperature offsets occurs in the neutral point outputs A and B as shown in FIG. 4B and the amplifier circuit output OP1 changes as shown in FIG. 4C, the voltage of the comparison level Vref1 of the comparator circuit is adjusted depending upon the temperature offset of the amplifier circuit output OP1.

Figure 4A:
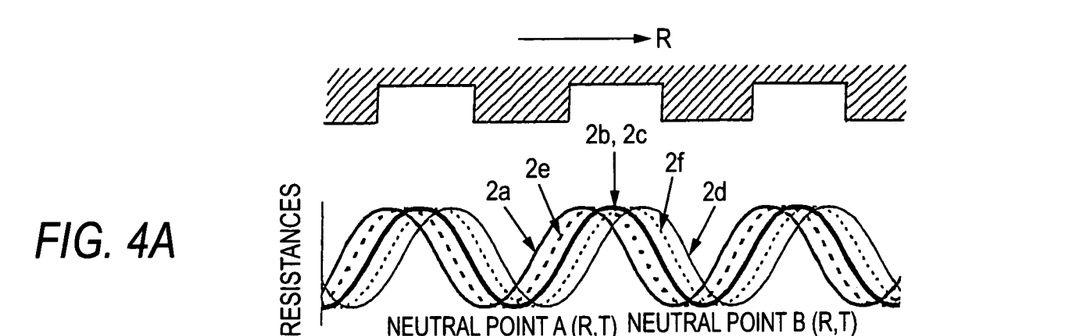
FIGS. 4A-4E,4G; is a diagram of signal waveforms at various portions at the occurrence of a temperature offset while rotating forward according to the embodiment 1 of the invention.
Figure 4B:
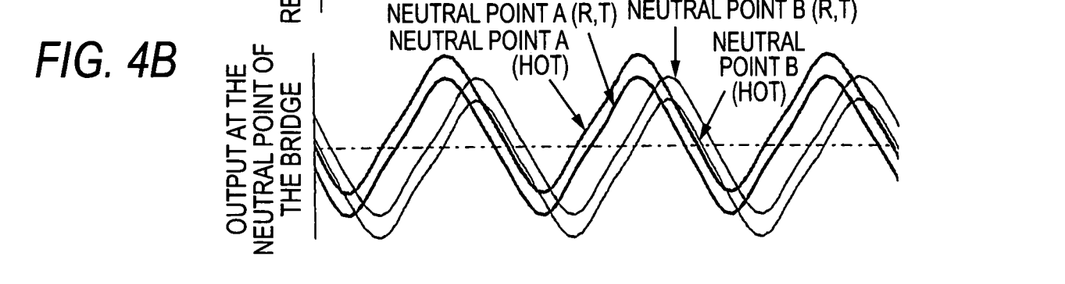
Figure 4C:
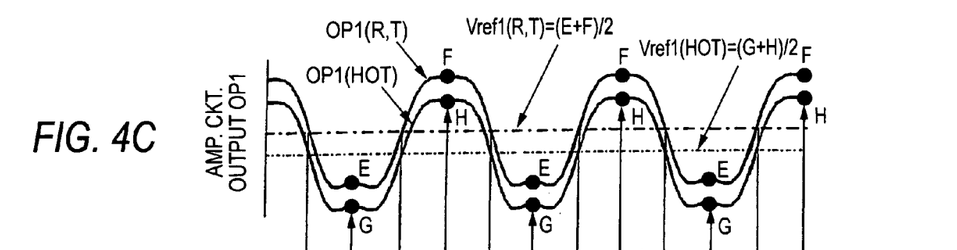

That is, for example, the amplifier circuit output OP1 in the room temperature state (R.T) is read for its voltage at points E and F at the timings of Vout2 (see FIG. 4D), and the comparison level-adjusting circuit 15 operates (E+F)/2, which is then output as a comparison level Vref1 (R.T) of the comparator circuit 13. On the other hand, the amplifier circuit output OP1 in the high-temperature state (HOT) is read for its voltage at points G and H at the timings of Vout2, and the comparison level-adjusting circuit 15 operates (G+H)/2, which is then output as a comparison level Vref1 (HOT) of the comparator circuit 13.

Figure 4D:
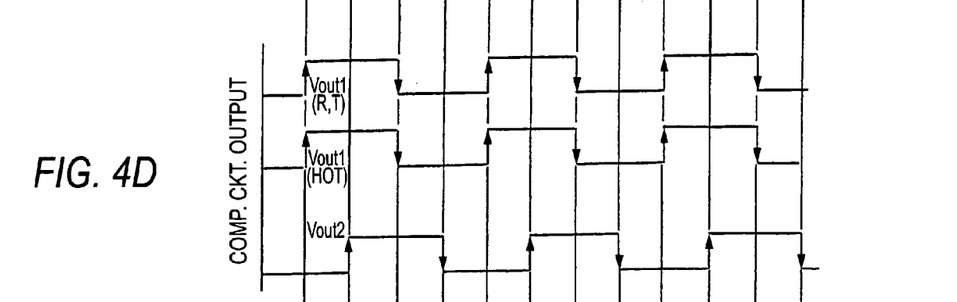
Figure 4E:
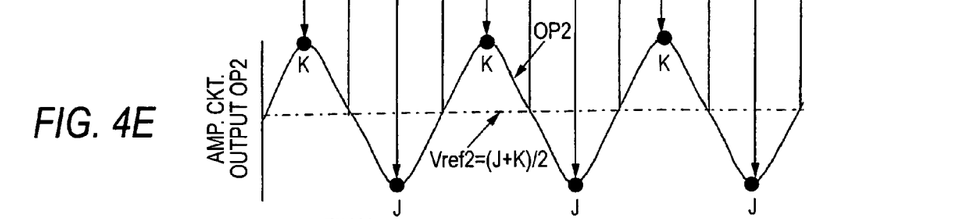

Further, the amplifier circuit output OP2 in FIG. 4E is read for its voltage at points K and J at the timings of Vout1, and the comparison level-adjusting circuit 25 operates (K+J)/2, which is then output as a comparison level Vref2 of the comparator circuit 23.

Figure 4G:
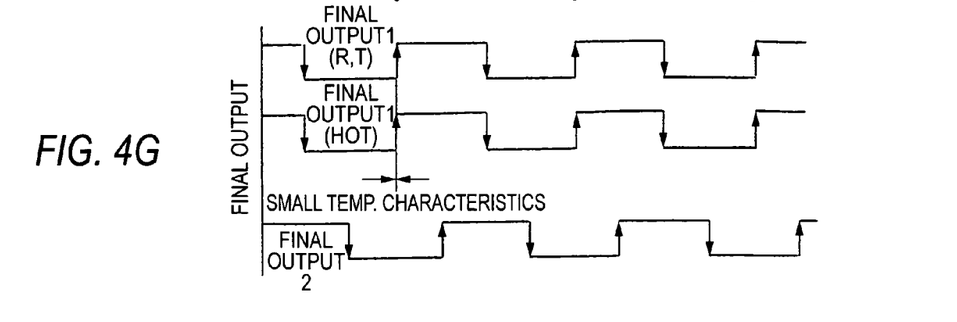

Therefore, the comparator circuit outputs Vout1 and Vout2 are not affected by a change in the temperature as shown in FIG. 4D; i.e., stable output voltages are obtained at all times, so that temperature characteristics of the final outputs 1 and 2 as shown in FIG. 4G are improved.

The above embodiment have dealt with the case where the comparison levels of the comparator circuits that work to shape the waveforms of the differential output signal of the first and second bridge circuits are adjusted by the output signal of the third bridge circuit at a predetermined timing of the differential output signal of the first and second bridge circuits, and the comparison level of the comparator circuit that work to shape the waveform of the output signal of the third bridge circuit is adjusted by the differential output signal of the first and second bridge circuits at a predetermined timing of the output signal of the third bridge. Here, however, the comparison level of the comparator circuit to shape the waveform of the differential output signal of the first and second bridge circuits only may be adjusted.

Various modifications and alterations of this invention will be apparent to those skilled in the art without departing from the scope and spirit of this invention, and it should be understood that this is not limited to the illustrative embodiments set forth herein.

What is claimed is:

1. A magnetic detector comprising a detection unit constituted by a magnetic/electric conversion element which has a plurality of segments for detecting the intensity of the applied magnetic field; a magnet arranged for applying a magnetic field to the magnetic/electric conversion element; and a magnetic moving body for varying the magnetic field; wherein, the magnetic/electric conversion element is constituted by at least six segments symmetrically arranged in a direction in which the magnetic moving body rotates maintaining a predetermined pitch with respect to the center line of the magnet that intersects the direction of rotation of the magnetic moving body at right angles;

first and second bridge circuits are constituted to include at least two pairs among the segments which are so arranged that the centers of pitch are symmetrical to each other with respect to the center line of the magnet so as to produce outputs accompanying the rotation of the magnetic moving body; and a third bridge circuit is constituted to include at least a pair among the segments having a center of pitch on the center line of the magnet so as to produce an output accompanying the rotation of the magnetic moving body; and wherein, a comparison level of a comparator circuit that shapes the waveform of a differential output signal of the first and second bridge circuits is adjusted relying upon an output signal of the third bridge circuit.

2. A magnetic detector according to claim 1, wherein the comparison level of the comparator circuit that works to shape the waveform of the output signal of the third bridge circuit is adjusted by the differential output signal of the first and second bridge circuits.

3. A magnetic detector comprising a detection unit constituted by a magnetic/electric conversion element which has a plurality of segments for detecting the intensity of the applied magnetic field; a magnet arranged for applying a magnetic field to the magnetic/electric conversion element; and a magnetic moving body for varying the magnetic field; wherein, the magnetic/electric conversion element is constituted by a plurality of pairs of segments symmetrically arranged in a direction in which the magnetic moving body rotates maintaining a predetermined pitch with respect to the center line of the magnet that intersects the direction of rotation of the magnetic moving body at right angles;

first and second bridge circuits are constituted to include at least two pairs among the segments which are so arranged that the centers of pitch are symmetrical to each other with respect to the center line of the magnet so as to produce outputs accompanying the rotation of the magnetic moving body; and a third bridge circuit is constituted to include at least a pair among the segments having a center of pitch on the center line of the magnet so as to produce an output accompanying the rotation of the magnetic moving body; and wherein, the magnetic detector further includes a first comparator circuit for shaping the waveform of a differential output signal of the first and second bridge circuits, a second comparator circuit for shaping the waveform of the output signal of the third bridge circuit, a first comparison level-adjusting circuit for adjusting the comparison level of the first comparator circuit relying upon an output signal of the third bridge circuit at a predetermined timing of the differential output signal of the first and second bridge circuits, a second comparison level-adjusting circuit for adjusting the comparison level of the second comparator circuit relying upon a differential output signal of the first and second bridge circuits at a predetermined timing of the output signal of the third bridge circuit, and an output circuit for producing outputs from the first and second comparator circuits.

4. A magnetic detector according to claim 3, wherein the first comparison level-adjusting circuit adjusts the comparison level of the first comparator circuit by operating an average value of differential output signals of the first and second bridge circuits at rising and breaking timings of the output signals of the third bridge circuit.

5. A magnetic detector according to claim 3, wherein the second comparison level-adjusting circuit adjusts the comparison level of the second comparator circuit by operating an average value of output signals of the third bridge circuit at rising and breaking timings of the output signals of the first bridge circuit.

* * * * *